United States Patent

Freudelsperger

Patent Number: 5,573,368
Date of Patent: Nov. 12, 1996

[54] COMMISSIONING DEVICE

[75] Inventor: Karl Freudelsperger, Hart bei Graz, Austria

[73] Assignee: Knapp Logistik Automation Gesellschaft m.b.H., Hart bei Graz, Austria

[21] Appl. No.: 411,318

[22] Filed: Mar. 28, 1995

[30] Foreign Application Priority Data

Mar. 28, 1994 [AT] Austria ................. 666/94

[51] Int. Cl.⁶ ................................ B65G 59/06
[52] U.S. Cl. ............... 414/795.8; 221/11; 414/797.9
[58] Field of Search ............... 271/157; 414/795.8, 414/797.9; 221/11, 106, 131

[56] References Cited

U.S. PATENT DOCUMENTS

| | | |
|---|---|---|
| 3,603,462 | 9/1971 | Moser . |
| 4,000,821 | 1/1977 | Naito et al. .................. 414/797.9 X |
| 5,024,348 | 6/1991 | Kronseder .................. 271/157 X |
| 5,271,703 | 12/1993 | Lindqvist et al. .................. 414/797.9 X |
| 5,439,345 | 8/1995 | Ivo .................. 414/797.9 |

FOREIGN PATENT DOCUMENTS

| | | |
|---|---|---|
| 1919521 | 6/1976 | Germany . |
| 4225041 | 2/1994 | Germany . |

Primary Examiner—Karen Merritt
Assistant Examiner—Janice L. Krizek
Attorney, Agent, or Firm—Sughrue, Mion, Zinn, Macpeak & Seas

[57] ABSTRACT

A commissioning device has several shift-out magazines arranged on a conveying path for accommodating items stacked therein. The items are introduced in insert spaces of the shift-out magazines in the form of item stacks. The shift-out magazines are preceded by an item stack throughput storage device each equipped with an itermittently operated advancing device, and when the advancing device is triggered, a row of item stacks present in said throughput storage device is moved forward by one receiving space, and the at least one foremost item stack is introduced into the insert space of the respective shift-out magazine. In the shift-out magazines, the insert spaces are located beside the shift-out spaces, and a transverse slide is arranged in the insert space for shifting the item stacks into an adjacent shift-out space. In each shift-out space there is provided a supply sensor by which a transverse shifting step of the transverse slide can be triggered as soon as the supply of items present in the shift-out space has fallen below a pre-determined limit by the successive shifting out of item units, and by this transverse shifting step an item stack can be transferred from the insert space into the respective shift-out space.

26 Claims, 8 Drawing Sheets

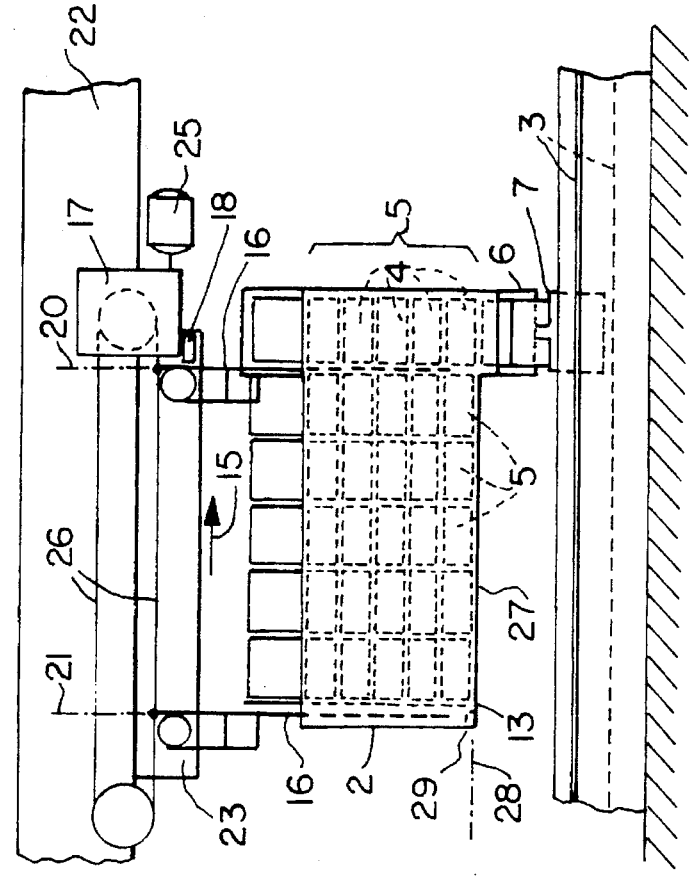

COMMISSIONING DEVICE

BACKGROUND OF THE INVENTION

The invention relates to a commissioning device comprising a plurality of shift-out magazines arranged along a conveying path, in particular at a conveying belt, and provided for accommodating items stacked therein, these items being capable of being introduced in the form of item stacks into insert spaces provided in the shift-out magazines, from where these items reach shift-out spaces also provided in the shift-out magazines and equipped with a shifting device by which the items located in a shift-out space of the respective shift-out magazine can be shifted out individually onto the conveying path or the conveying belt, the conveying path or the conveying belt collecting the collective of items shifted out of the shift-out magazines according to the composition order of the individual commissions and delivering the same.

With commissioning devices of the above-indicated type, the item units may be shifted out onto the conveying path or conveying belt quickly and in the exact numbers in accordance with the respective commissioning order due to the fact that they are made ready to be shifted out by being stacked in a magazine, and all the items are collected on the conveying path or conveying belt according to the individual commissions.

SUMMARY OF THE INVENTION

It is an object of the present invention to provide a commissioning device of the above-indicated type, which enables, with a structurally simple design, rapid and exact supplementing of the item units lying in the shift-out magazines in stacks, such that also at a large material throughput, a sufficient amount of item units is always available in the shift-out magazines, and no delays occur in the delivery of the item units intended for the individual commissions.

The commissioning device according to the invention and of the type initially mentioned is characterised in that the shift-out magazines are each preceded by an item stack throughput storage means equipped with an intermittently operated advancing means for the row of the item stacks present in that storage means, wherein, when triggering the advancing means, the row of item stacks is driven mechanically or by means of gravity by one receiving space, and the item stack(s) located at the foremost position in the item stack throughput storage means is introduced into the insertion space of the shift-out magazine associated with that throughput storage means, and that the insert spaces are arranged beside the shift-out spaces in the shift-out magazines, one passageway each being provided between these spaces, through which passageway the item stacks are successively shiftable, in the transverse direction, from an insert space into the respective shift-out space, a transverse slide equipped with an automatic drive being arranged in the insert space for this shifting of the item stacks, and furthermore a supply sensor is provided in each shift-out space by which a transverse shifting step of the transverse slide can be triggered as soon as the supply of items present in the shift-out space of the respective shift-out magazine has fallen below a predetermined limit due to successive shifting out of the item units and room has become available for the introduction of a further item stack, and by this transverse shifting step an item stack is transferable from the insert space into the respective shift-out space, and that an end position switch actuatable by the transverse slide or the drive thereof is provided, by which end position switch the advancing means of the item stack throughput storage means can be triggered to introduce one or several item stacks into the insert space of the respective shift-out magazine, as soon as the transverse slide has reached an end position close to a shift-out space in the course of transferring the item stack, and thus the insert space has been cleared. By this design the above-indicated object may be met well. The commissioning device designed according to the invention has a relatively simple construction and makes it possible to supply large amounts of item units to the shift-out magazines without any problems and to effect the introduction of the items into the shift-out magazines quickly, such that even in the course of shifting out of a larger number of item units for a certain commission no pause or delay will occur in the shift-out procedure caused by the required supplying of items into the shift-out magazines.

An embodiment which is suitable with a view to structural expenditures required for shifting the items out of the shift-out spaces and to the space requirements for the shift-out spaces provides a shift-out space at each shift-out magazine. This embodiment is characterised in that the drive of the transverse slide is equipped with a return control means which actuates the transverse slide for a return into a starting position located on a side of the insert space opposite the end position and clearing the insert space, as soon as the transverse slide has reached an end position close to the shift-out space of the respective shift-out magazine in the course of the item stack transfer. A variant provides for two shift-out spaces at the shift-out magazines, the shift-out spaces being located at opposite sides of the insert space; the transverse slide, thus, after having reached an end position close to a shift-out space, at first may remain there until item stacks have again been introduced into the insert space, and it may then intermittently transfer these item stacks into the opposite shift-out space; thus, an empty return movement of the transverse slides is obviated.

A very simple structure may be obtained for the transverse slide if it is provided for the transverse slide to be guided on a support extending in the region of the insert space, outside of the insert path of the item stacks, in a manner so as to be movable to and fro thereon. It is furthermore suitable if an electric motor, a linear motor or a pneumatic working cylinder is provided for driving the transverse slide. Furthermore, the to-and-fro movement of the transverse slide may be controlled very easily in an embodiment which is characterised in that a continuous chain or belt is provided for transmitting the force to the transverse slide. Alternatively, also a number of other structural embodiments are feasible for transmitting the force to the transverse slide, such as, e.g., the use of crank drives, linear motors or pneumatic working cylinders. The support on which the transverse slide is guided may advantageously be arranged above the item stacks located in the insert space; an arrangement of this support in front of the insert space is also possible.

With a view to the re-supply of large amounts of item units into the insert space of the shift-out magazine it is suitable if the insert space of the shift-out magazines is designed to simultaneously receive several adjacent item stacks oriented in a row for passage into a shift-out space of the respective shift-out magazine. If desired, the arrangement may be such that the item stacks are introduced into the insert space one behind the other, wherein also the transverse slide may be used under a respective control to assist with and arrange the item stacks when the latter are introduced into the insert space. An embodiment which allows for an even faster yet operationally very simple re-supply of larger amounts of stacked items into the insert space of the shift-out magazines is characterised in that the advance direction of the item stacks at the delivery side of the item stack throughput storage means points directly to the introduction opening of the insert space, and that the loading area of the item stack throughput storage means has a width corresponding to several adjacently arranged item stacks and that also the introduction opening of the insert space of the shift-out magazine has such a width, and that in this manner always a row of item stacks can be introduced simultaneously and adjacently arranged from the item stack throughput storage means into the respective insert space.

To enable a transfer of the stacks of item units in as simple a manner from the insert space into the shift-out space of the shift-out magazines during operation, according to an embodiment whose construction is easy to realize, the bottom of the insert space on which the item stacks rest and are shiftable to the shift-out space extends on that level which corresponds to the limit of supply of items in the shift-out space monitored by the supply sensor.

For a good functioning when transversely shifting item stacks into the shift-out space of the shift-out magazines it is advantageous if relatively small forces suffice for this transverse shifting, and in this sense an embodiment is suitable which is characterised in that the bottom of the insert space on which the item stacks rest and are shiftable towards the shift-out space has a smooth sliding surface of metal or synthetic material. A variant on which transverse shifting of the item stacks is even easier to do but which requires more structural expenditures is characterised in that the bottom of the insert space on which the item stacks rest and are shiftable towards the shift-out space is equipped with a plurality of rollers distributedly arranged over the area of this bottom. A somewhat simpler alternative is an embodiment which is characterised in that the bottom of the insert space, on which the item stacks rest and are shiftable towards the shift-out space is formed by a conveying belt.

To obtain suitable operational properties, it is also advantageous to provide for as easy a movability as possible in the item stack throughput storage means from which the item stacks are introduced into the insert space of the shift-out magazines, so that the insertion procedure of the item stacks, which is always started when a demand for supply arises in the insert space, takes place with little expenditure of force and as easy to do as possible. In this respect, an embodiment is preferred which is characterised in that the item stack throughput storage means has a conveying bottom as the support for the item stacks. A structurally simple solution is for the conveying bottom to be formed by a conveying belt. A particularly easy movability which requires, however, somewhat more structural expenditures can be obtained if the conveying bottom is formed by a series of rollers.

As regards the supply sensor by which the transfer of item stacks from the insert space into a shift-out space of the shift-out magazines is controlled, a preferred embodiment provides that a photo-electric barrier or a light reflection sensor is provided as the supply sensor for the shift-out space. Such an embodiment of the supply sensor is easily adjustable, and this is favorable for adapting the commissioning device to differently designed items, e.g. packages of various sizes, in which the goods to be commissioned are contained. A variant is characterised in that an ultrasonic sensor is provided as the supply sensor for the shift-out space. A further variant which has the advantage that it can hardly be negatively affected by external light, noise, or dust or dirt, is characterised in that a mechanical sensing arm connected with a switch is provided as the supply sensor for the shift-out space.

As regards the shifting device present in the commissioning device constructed according to the invention, in a preferred embodiment a conveying belt, which preferably has nob-like catch noses or catch ledges at its side facing the item stack, is provided as the shifting device. A variant which enables an easy and quick functioning is characterised in that one or several rollers are provided as the shifting device. Advantageously, the drive for these embodiments is an electric motor. Thereinstead, also devices working with a linear motor or with a pneumatic advancing means may be provided for shifting the item units out of the shift-out space of the shift-out magazines.

To be particularly safe from an erroneous delivery of item units, the shifting device may, if desired, be equipped with a controllable locking flap.

BRIEF DESCRIPTION OF THE DRAWINGS

The invention will now be explained in more detail by way of examples and with reference to the drawings, in which such examples are schematically illustrated. In the drawings, FIG. 3 shows a partial section of this embodiment according to the arrow III in FIG. 2, and FIG. 4 is a partial illustration to FIG. 2;

DETAILED DESCRIPTION OF PREFERRED EMBODIMENTS

Figure 1:
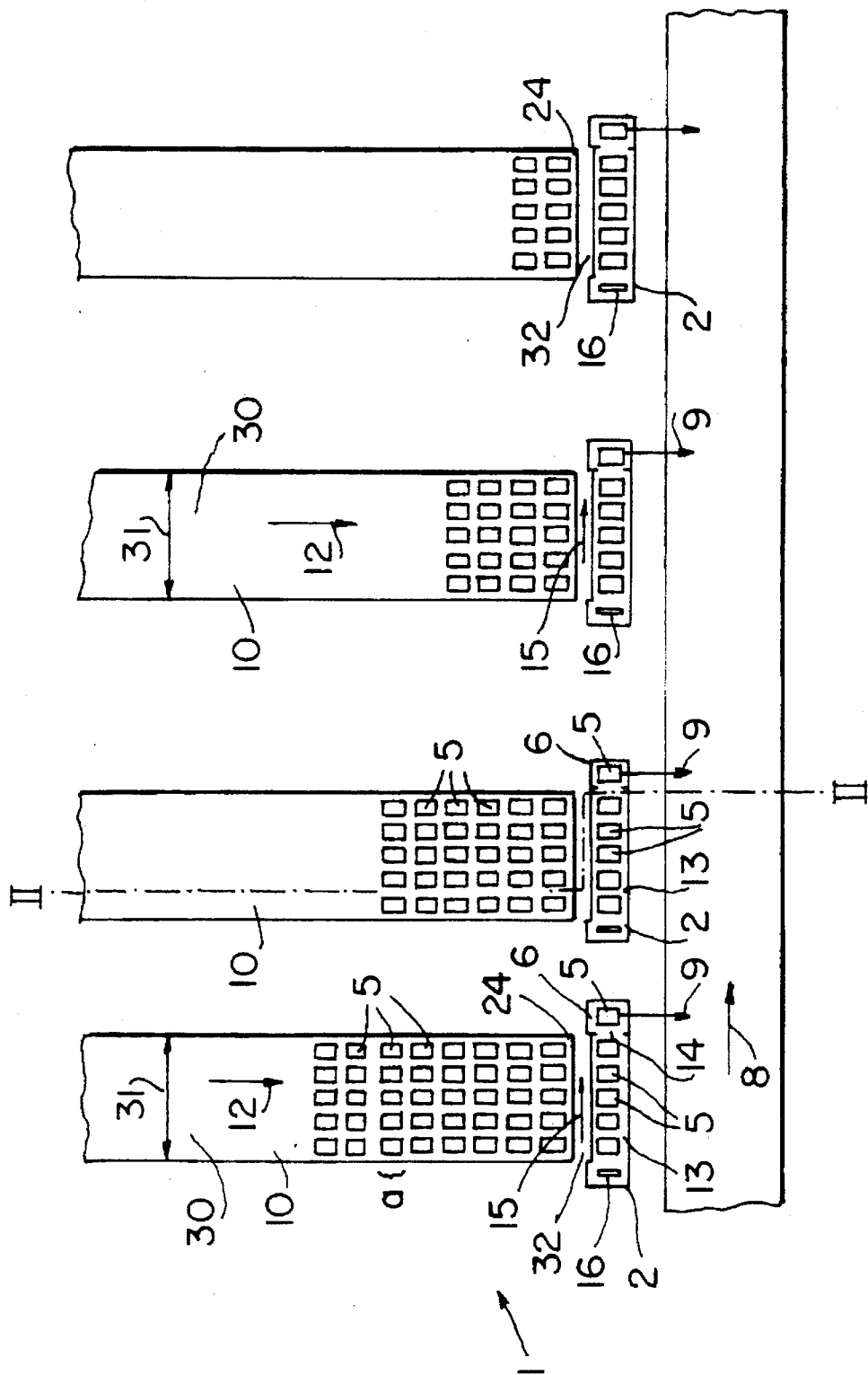
FIG. 1 is a top view of an embodiment of a commissioning device according to the invention, wherein various constructive details have been omitted to provide for a clear illustration.
Figure 2:
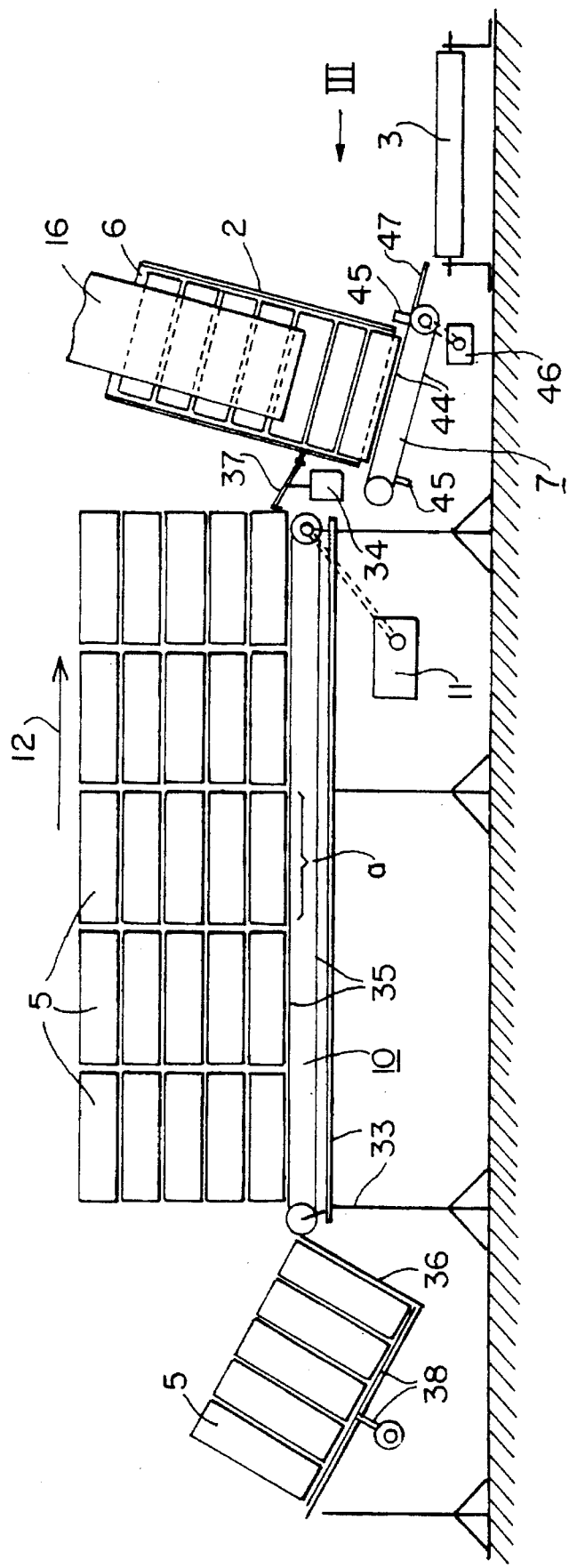
FIG. 2 shows this embodiment in a section along line II—II of FIG. 1.

In the embodiment of a commissioning device 1 designed according to the invention and illustrated in FIGS. 1 to 4, several shift-out magazines 2 are provided, which are arranged along a conveying path 3. Such a conveying path may, e.g., be formed by a conveying belt. The shift-out magazines 2 have a shift-out space 6 which accommodates the item units 4 in a stacked manner, and a shifting device 7 engaging in the shift-out space 6 at its lower side is provided, by which the items present in the shift-out space 6 of the respective shift-out magazine 2 can be shifted out individually onto the conveying path 3; the conveying path 3 collects the items shifted out of the various shift-out magazines according to the composition order of the individual commissions and delivers the same to a collecting container or the like, not illustrated in detail in the drawings. The item units 4 can be introduced in the form of item stacks 5 into an insert space 13 provided in the shift-out magazines 2, and from this insert space they get into the shift-out space 6 as soon as room has been made in the shift out space for the accommodation of a new item stack 5 by the respective delivery of the items which had been present there before.

The shift-out magazines 2 are preceded by one item stack throughput storage means 10 each, which is provided with an intermittently operated advancing means 11 for the row of item stacks 5 present in this storage means 10. When the advancing means 11 is triggered, the row of item stacks 5 is forwardly advanced in the advance direction 12 by one step corresponding to a receiving space a, and the item stack(s) 5 located at the foremost position in the item stack throughput storage means 10 is (are) introduced into the insert space 13 of the shift-out magazine 2 associated with this throughput storage means 10. In the shift-out magazines 2, the insert space 13 is located beside the shift-out space 6, and between these two spaces 6, 13 a passageway 14 is provided through which the item stacks 5 can be shifted one after the other in the transverse direction 15 from the insert space 13 into the shift-out space 6. In the insert space a transverse slide 16 equipped with an automatic transverse slide drive 17 is arranged for shifting the item stacks from the insert space 13 into the shift-out space 6. In the shift-out space 6 a supply sensor 19 is arranged, which actuates the transverse slide drive 17 as soon as the amount of items stored in a shift-out space 6 of the respective shift-out magazine has fallen below a pre-determined limit and thus room has become available for the introduction of a further item stack 5, so as to trigger one transverse shifting step of the transverse slide 16 for the transfer of an item stack 5 from the insert space 13 into the shift-out space 6. When, in the course of its intermittent movement in the direction towards the passageway 14, the transverse slide 16 has reached its end position 20, it triggers a return control means 18 located there, which in turn causes the transverse slide 16 to be moved by the transverse slide drive 17 into the starting position 21 located opposite the end position 20; then the insert space 13 may again be loaded with one or several item stacks 5 from the item stack throughput storage means 10.

For this purpose, the advancing means 11 of the item stack throughput storage means 10 is actuated accordingly to introduce one or several item stacks into the insert space of the respective shift-out magazine.

The transverse slide 16 is guided on a support 22 extending outside of the insert path of the item stacks 5 in the region of the insert space 13 in the transverse direction 15, in a manner so as to be movable to and fro, a console 23 with a sled guide being mounted on the support 22 for this purpose. In the instance illustrated, the transverse slide drive 17 is provided with an electric motor 25 and acts on a chain 26 or a belt or the like, which is provided for the transmission of force to the transverse slide 16 and is guided to rotate endlessly. The drive of the transverse slide 16 may, however, also be designed in a different manner, e.g. with a screw spindle alternately driven in either rotation direction by an electric motor via a suitable gear, or by means of a linear motor or by means of a pneumatic working cylinder or the like. In FIG. 4, two alternatively possible placements of the support 22 are entered; according to the one alternative illustrated in full lines and corresponding to FIG. 3, the support is arranged above the item stack located in the insert space 13; according to the other alternative illustrated in broken lines, the support 22' and, together therewith, the console 23' and the transverse slide drive 17' with the motor 25' are arranged in front of the insert space 13.

In the embodiment illustrated in FIGS. 1 to 4, the insert space 13 of the shift-out magazines 2 is designed to simultaneously receive several item stacks 5 one beside the other in a row oriented towards the passageway 14 into the shift-out space 6 (arrow 15). The advance direction 12 of the item stacks 5 at the delivery side 24 of the item stack throughput storage means 10 points directly to the introduction opening 32 of the insert space 13, and the loading area 30 of the item stack throughput storage means 10 has a width 31 corresponding to several adjacently arranged item stacks 5, and also the introduction opening 32 of the insert space 13 of the shift-out magazine 2 has such a width, so that always a row of item stacks 5 can be introduced simultaneously adjacently arranged, from the item stack throughput storage means 10 into the insert space 13. The loading area 30 of the item stack throughput storage means 10 is formed by a conveying bottom in the form of a conveying belt 35 arranged on the carrying structure 33 of the storage means 10, which conveying belt is connected with the advancing means 11 by which the item stacks 5 resting on the loading area 30 can be moved on intermittently. The advancing means 11 may, e.g., be equipped with an electric motor; for the intermittent advance movement of an obliquely downwardly extending conveying belt 35, it is, however, also possible to provide a stop mechanism, by which a movement of the item stacks 5 effected under the influence of gravity is stopped or controlled intermittently. For an additional guarantee that the transfer of the item stacks into the insert space 13 takes place at the respective planned point of time, a stop flap 37 to be actuated by a respectively controlled drive 34 is provided.

The bottom 27 of the insert space 13 extends at the level denoted by 28 in the drawings, which corresponds to the level in the shift-out space 6 monitored by the supply sensor 19, and in this manner the item stacks on the bottom 27 can be directly shifted into the shift-out space 6, as soon as the supply of items stored in the shift-out space has fallen so low that the supply sensor 19 reacts. The bottom of the insert space 13 is provided with a smooth sliding surface 29 of metal or synthetic material, so that shifting of the item stacks 5 is easy to do. In the case illustrated, a photoelectric barrier is provided as the supply sensor 19 for the shift-out space 6, yet also other sensor means are suited for this purpose; thus, e.g., a light reflection sensor or an ultrasonic sensor may be provided instead of a photoelectric barrier.

The shifting device 7 provided for shifting the item units 4 out of the shift-out space 6 is formed by a conveying belt 44 provided with knob-like catch noses or catch ledges 45 at its side facing the item stack 5. By means of this conveying belt 44, a controllable drive 46 effects the individual shifting out of the items from the shift-out space 6 in the direction of the arrow 9, the items getting onto the conveying path 3 via a plate chute 47, where they are transported away in the direction of movement 8 of this conveying path.

A loading flap 36 is provided for re-supplying item stacks 5 into the item stack throughput storage means 10, by means of which the item stacks 5 are lifted to the level of the loading area. For transfering the item stacks 5 to the loading area 30, a slide 38 is provided on the loading flap 36.

Figure 5:
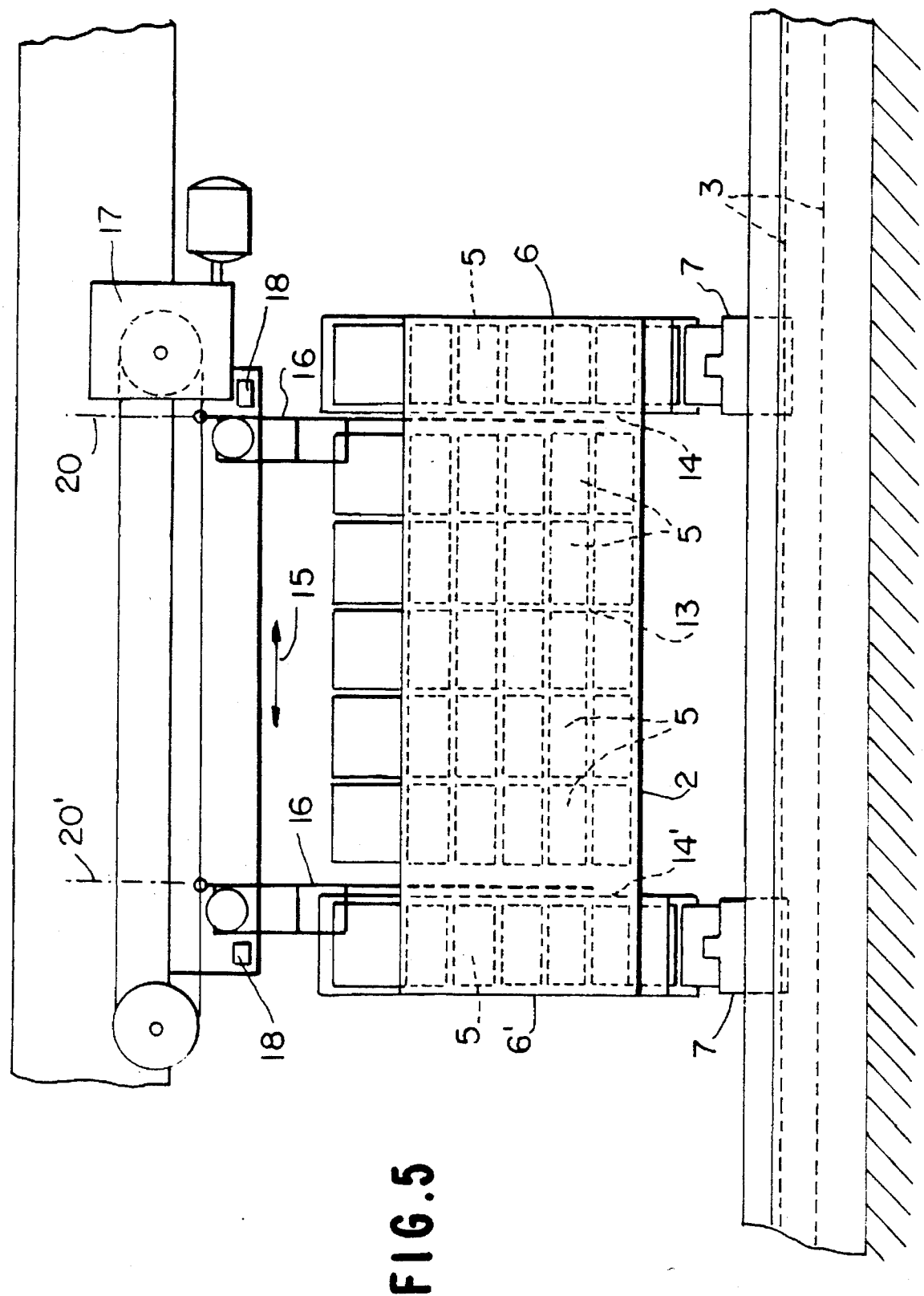
FIG. 5 shows a variant in which a shift-out magazine is provided which has two shift-out spaces, in an illustration corresponding to FIG. 3.

In the variant illustrated in FIG. 5, a shift-out magazine 2 is provided which has two shift-out spaces 6, 6'. These shift-out spaces 6, 6' are located at opposite sides of the insert space 13 in the transverse direction 15, one passageway 14, 14', respectively, being each provided between the insert space and the respective shift-out space 6, 6', respectively, through which the item stacks 5 are intermittently transferable from the insert space 13 into the respective shift-out space by means of the transverse slide 16. The insert space and the positioning of the transverse slide 16 in the end position 20 located at the right-hand side in FIG. 5, as well as in the end position 20' located at the left-hand side in FIG. 5 are such that the introduction of the item stacks into the insert space 13 is not hampered by the transverse slide, when the latter is in one of its end positions 20, 20'. Thus, item stacks 5 can be introduced into the insert space after the transverse slide has reached one of its end positions 20, 20', and subsequently the transverse slide can, at once, intermittently transfer these item stacks into the shift-out space located opposite its position without requiring movement of the transverse slide into a different starting position, and thus the transverse slide can be utilized more fully.

Figure 6:
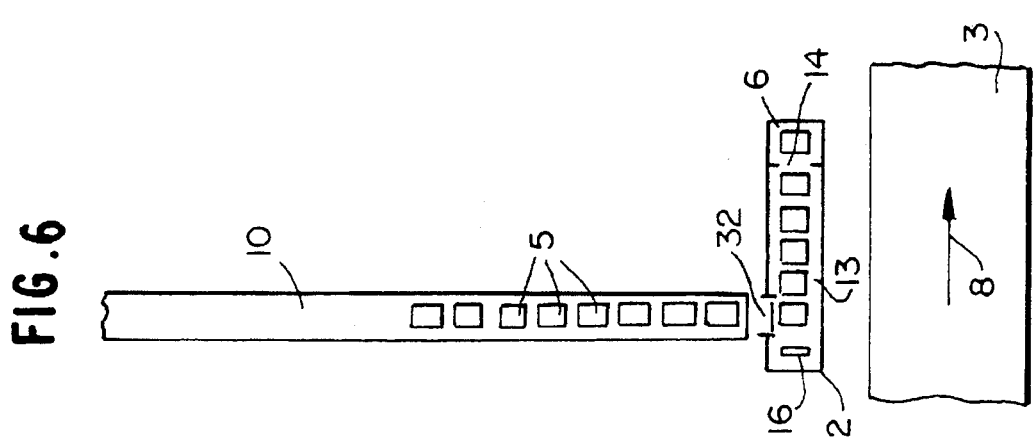
FIG. 6 is a top view of the region of a shift-out magazine of an embodiment of the commissioning device, in which the item stacks are individually introduced into the insert space.

In the embodiment illustrated in FIG. 6, only one row of item stacks 5 is provided in the item stack throughput storage means 10, and the introduction opening 32 of the insert space 13 of the shift-out magazine 2 located opposite the delivery side 24 of the item stack throughput storage means 10 has a width corresponding to the introduction of only one item stack 5 each. The insert space 13 is designed for the simultaneous accommodation of several item stacks 5 in a row directed to the passageway 14 into the shift-out space 6. In this case, loading of the insert space with item stacks 5 is effected in several consecutive steps, wherein, by means of an appropriate control, the transverse slide 16 is used to form a row of item stacks following upon the passageway 14 in the insert space 13.

Figure 7:
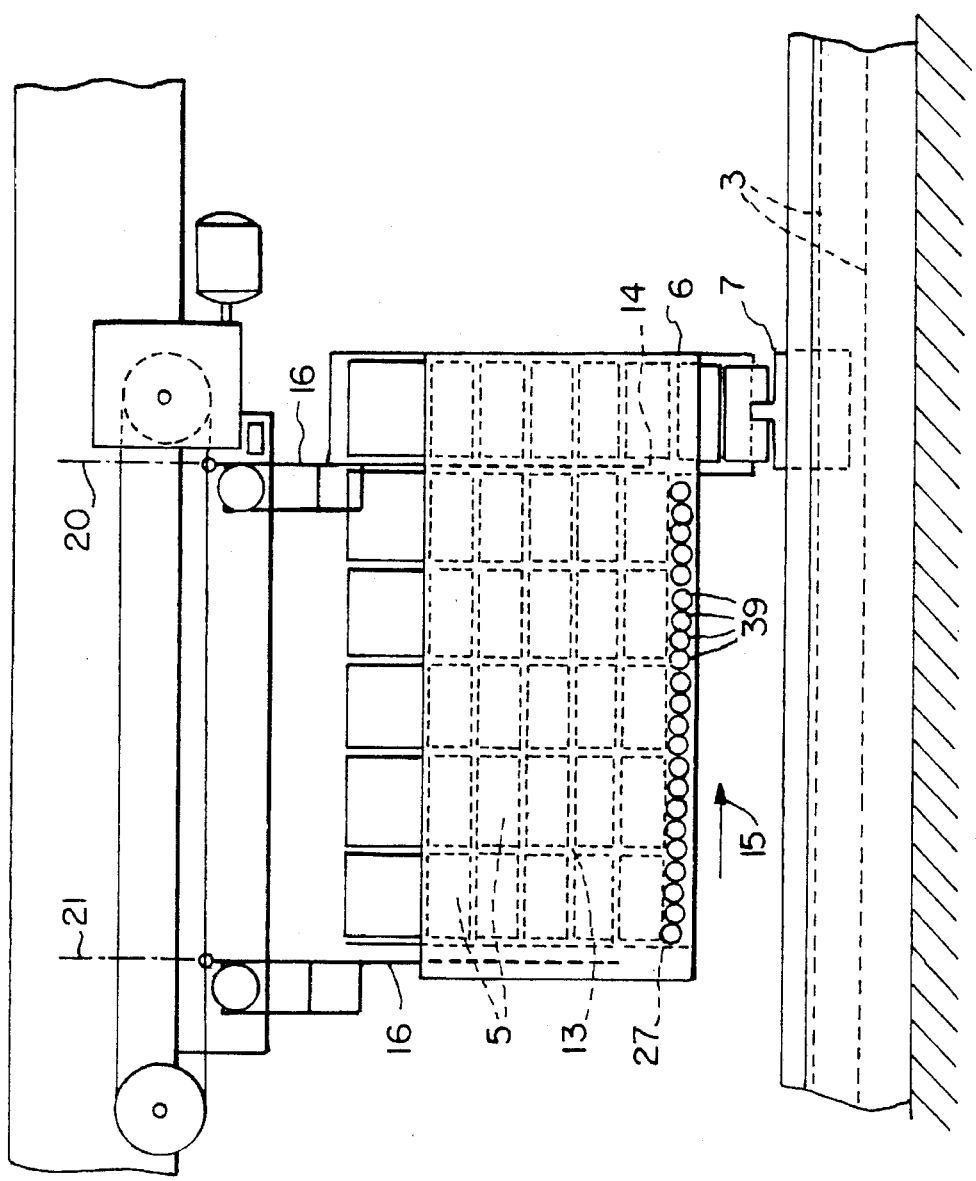
FIG. 7 shows a further variant of the shift-out magazine in an illustration corresponding to FIG. 3.

In the embodiment according to FIG. 7, the bottom 27 of the insert space 13 of the shift-out magazine 2 is designed as a roller bottom to provide for an easy shiftability of the item stacks in the transverse direction 15, i.e. rollers 39 are distributedly arranged over the entire area of the bottom 27, the item stacks 5 resting on these rollers, so that the item stacks can be shifted with relatively low expenditure of force towards the passageway 14 of the shift-out magazine 2, even if the item stacks are heavier.

Figure 8:
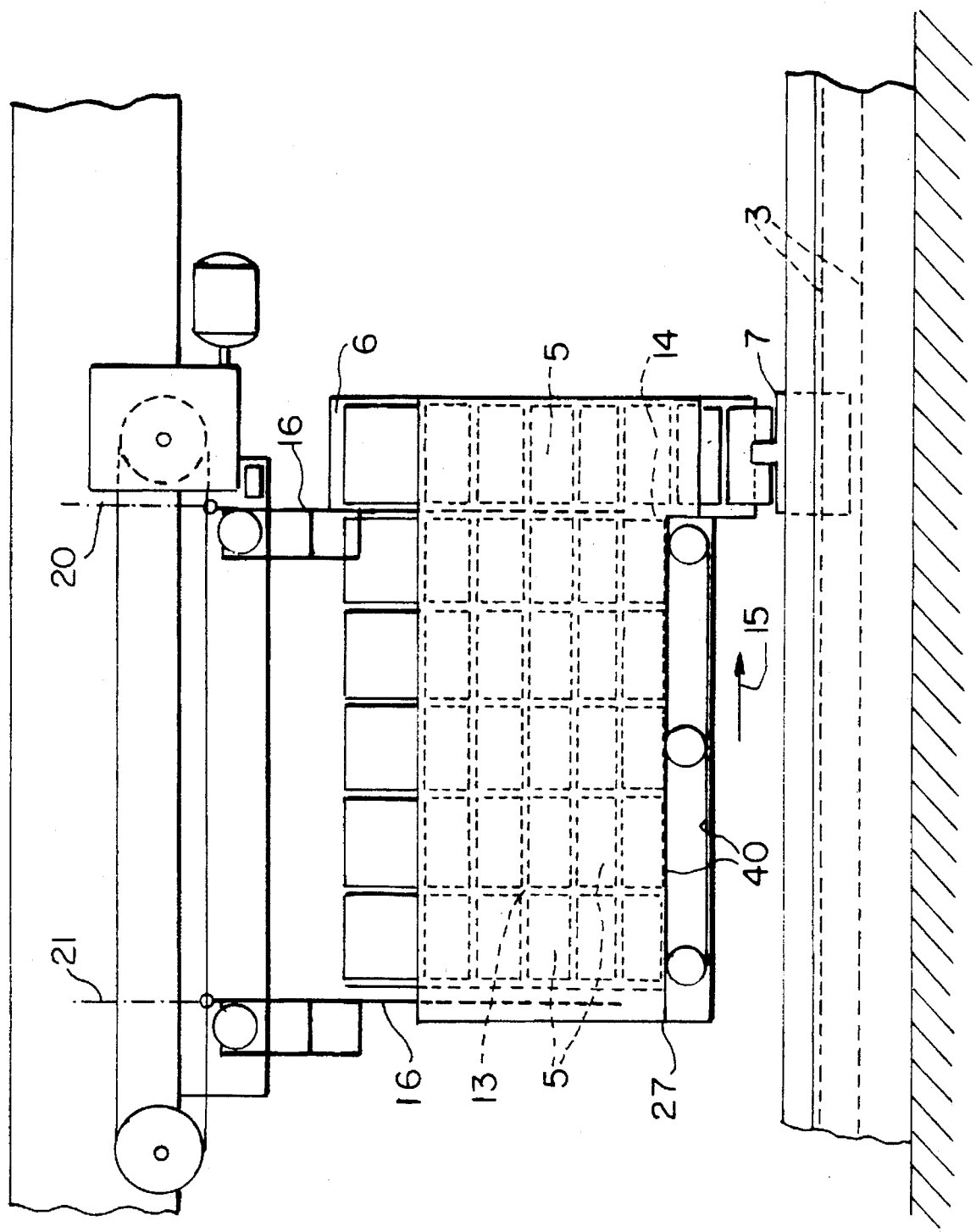
FIG. 8 shows a third variant of the shift-out magazine in an illustration corresponding to FIG. 3.

FIG. 8 shows a variant as compared to the embodiment according to FIG. 7, wherein in this variant the bottom 27 of the insert space 13 of the shift-out magazine 2 is formed by a conveying belt 40. Also in this instance, a relatively easy shiftability of the item stacks present in the insert space 13 towards the passageway 14 can be obtained.

Figure 9:
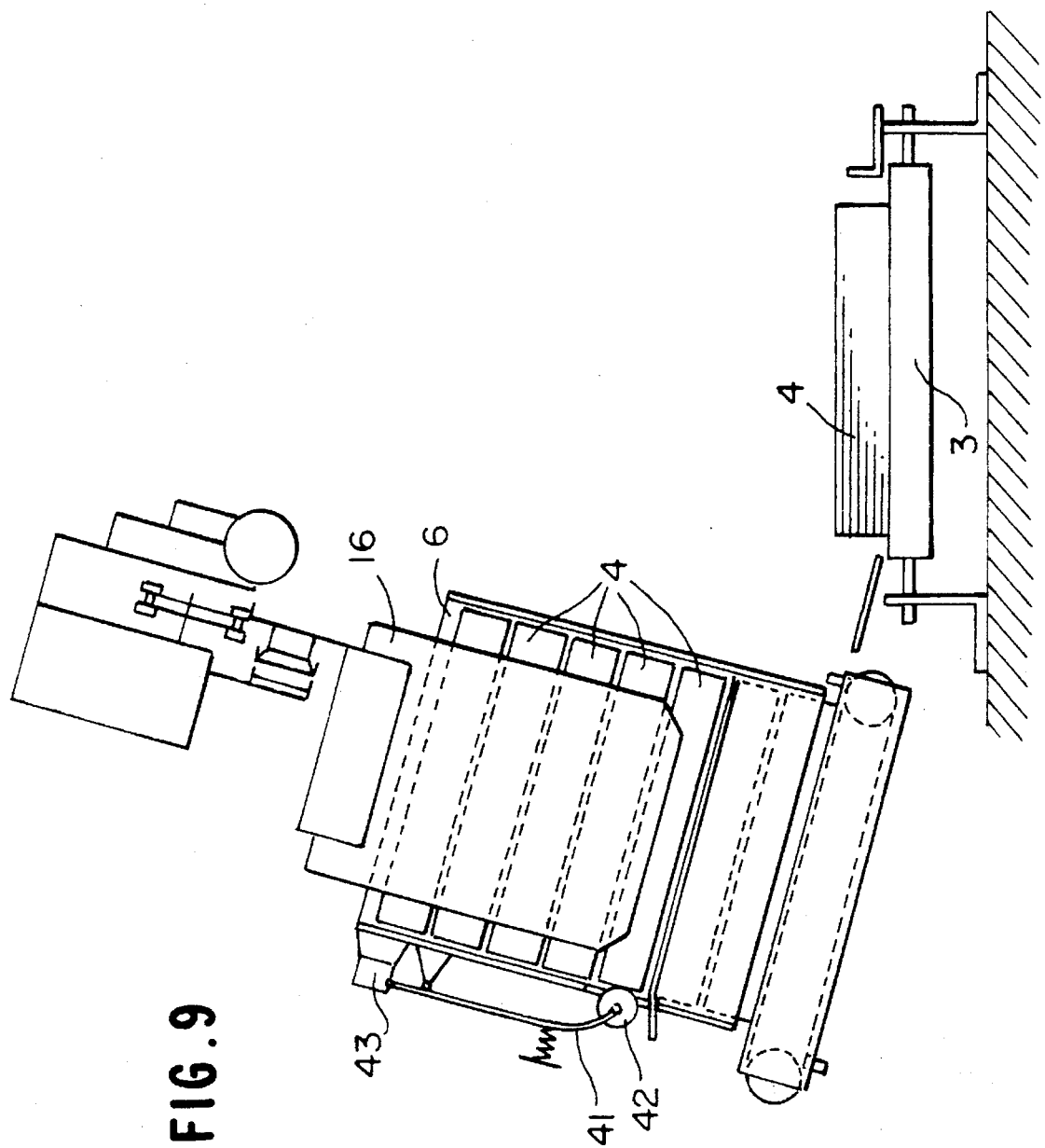
FIG. 9 shows an embodiment, in which the sensor provided in the shift-out space of the shift-out magazine is a mechanical sensing arm.

FIG. 9 shows an embodiment of the shift-out magazine of a commissioning device of the type discussed here, in which the supply sensor provided in the shift-out space 6 is designed as a mechanical sensing arm 41. This sensing arm carries a roller 42 extending into the shift-out space 6 and is pressed outward by the superimposed stacked item units 4. As soon as the last item unit has left the range of the roller 42 in the course of subsequent shift-outs of these item units out of the shift-out space 6, the sensing arm 41 pivots in, and the switch 43, which is connected with the sensing arm 41, emits a signal, causing the transverse slide 16 to introduce an item stack into the shift-out space 6.

Figure 10:
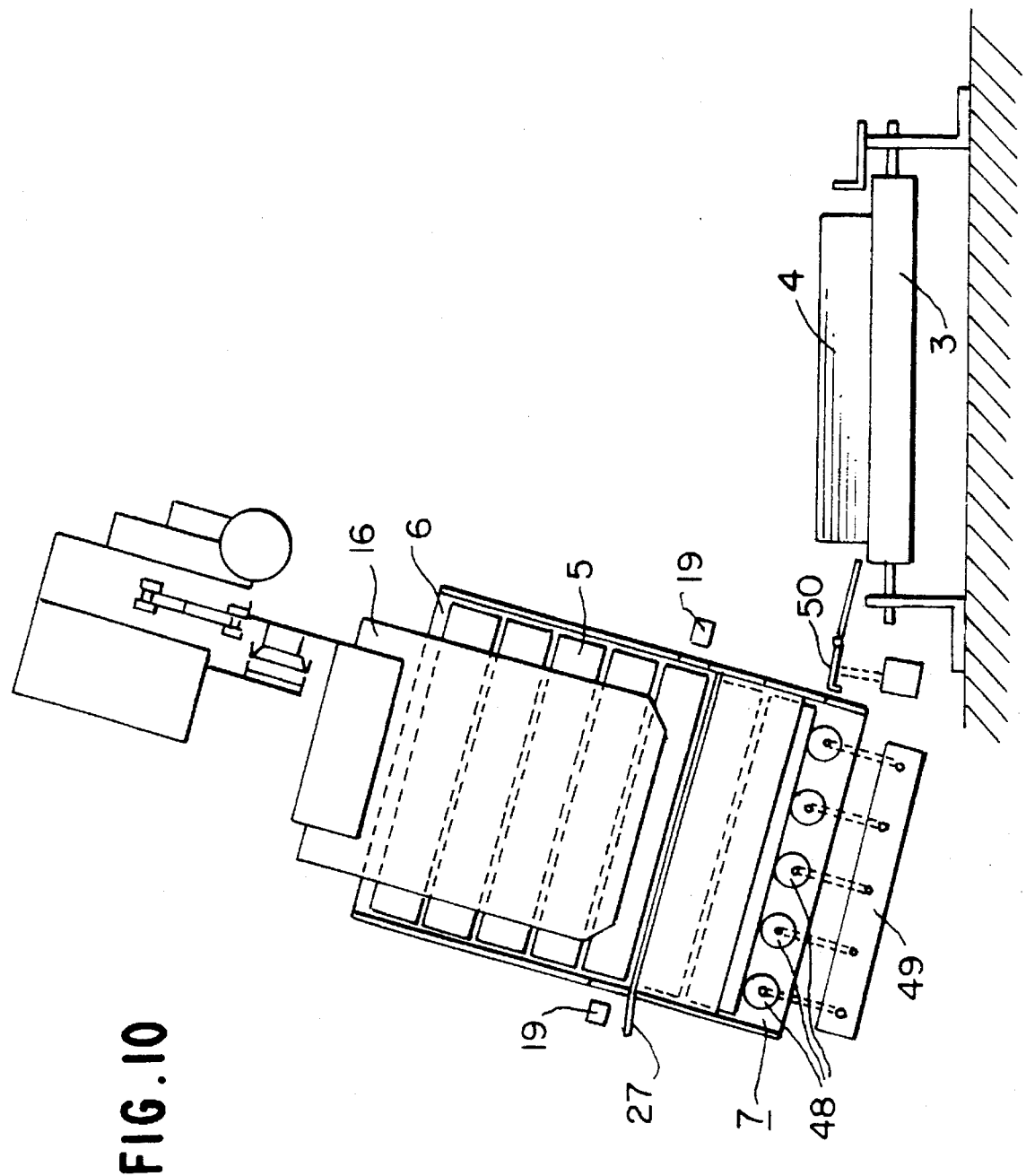
FIG. 10 shows an embodiment in which a shifting device formed by rollers is provided.

FIG. 10 shows an embodiment in which the shifting device 7 provided at the lower side of the shift-out space 6 of the shift-out magazine 2 is formed by several mechanically drivable rollers 48 which can be set into rotation by a driving means 49 controlled in accordance with the respective commissioning. A locking flap 50 controlled correspondingly to the drive means 49 provides additional safety as to the exact numbers of the item units 4 delivered on the conveying path 3.

What I claim is:

1. A commissioning device comprising:

a conveying means;

a plurality of shift-out magazines disposed along said conveying means and arranged to accommodate items in stacked relationship, said shift-out magazines including insert spaces for introduction of said items in item stacks and shift-out spaces into which said item stacks are transferred from said insert spaces;

a shifting device associated with the shift-out spaces of said shift-out magazines and arranged to shift the items accommodated in said shift-out spaces individually from a respective one of the shift-out spaces onto the conveying means;

said conveying means arranged to collect collectives of items shifted out of the shift-out magazines according to composition orders of individual commissions and delivering said collectives of items;

an item stack throughput storage means provided for each shift-out magazine upstream thereof, an intermittently operated advancing means associated with said item stack throughput storage means and arranged for advancing a row of item stacks present in said item stack throughput storage means in an advance direction by one receiving space each time said advancing means is operated, at least the foremost one of the item stacks present in said item stack throughput storage means being introduced into the insert space of the shift-out magazine associated with said item stack throughput storage means by said advancing means, said insert spaces being arranged beside said shift-out spaces in said shift-out magazines with one passageway each provided between said insert spaces and said shift-out spaces for successive movement of the item stacks through said passageway in a transverse direction perpendicular to said advance direction from an insert space into the respective shift-out space, a transverse slide provided in said insert space and having an automatic drive for shifting the item stacks in said transverse direction, a supply sensor being provided in each shift-out space to trigger a transverse shifting step of said transverse slide for transferring an item stack from said insert space into the respective shift-out space as soon as the supply of items present in the shift-out space of the respective shift-out magazine has fallen below a certain limit due to successive shifting out of items and room has become available for introduction of a further item stack, an end position switch being provided to trigger the advancing means of the item stack throughput storage means for introduction of at least one item stack into the insert space of the respective shift-out magazine as soon as said transverse slide has reached an end position close to a shift-out space during transfer of item stacks and thus an insert space has been cleared.

2. A commissioning device as set forth in claim 1, further comprising mechanical driving means for advancing the row of item stacks by one receiving space upon triggering of said advancing means.

3. A commissioning device as set forth in claim 1, wherein said end position switch is capable of being actuated by said transverse slide.

4. A commissioning device as set forth in claim 1, wherein said end position switch is capable of being actuated by said automatic drive of said transverse slide.

5. A commissioning device as set forth in claim 1, further comprising a return control means provided for the drive of said transverse slide to actuate said transverse slide having reached an end position close to the shift-out space of the respective shift-out magazine in the course of transfering item stacks, for a return into a starting position located on a side of said insert space opposite said end position and clearing said insert space.

6. A commissioning device as set forth in claim 1, further comprising a support extending in the region of the insert space, outside of the insertion path of the item stacks, guiding means being provided for a to-and-fro-movement of said transverse slide on said support.

7. A commissioning device as set forth in claim 6, further comprising one of an endless chain and a belt, provided for a transmission of force to the transverse slide.

8. A commissioning device as set forth in claim 1, wherein said automatic drive of said transverse slide is one of an electric motor, a linear motor and a pneumatic working cylinder.

9. A commissioning device as set forth in claim 8, further comprising one of an endless chain and a belt, provided for a transmission of force to the transverse slide.

10. A commissioning device as set forth in claim 1, wherein said insert space of said shift-out magazine is designed to simultaneously accommodate several adjacent item stacks oriented in a row aligned with the passageway into a shift-out space of the respective shift-out magazine.

11. A commissioning device as set forth in claim 10, wherein the advance direction of the item stacks at the delivery side of the item stack throughput storage means points directly to the introduction opening of the insert space, and wherein said item stack throughput storage means has a loading area, said loading area having a width corresponding to several adjacent item stacks, and wherein said introduction opening of said insert space of the shift-out magazine also has a width corresponding to several adjacent item stacks, a row of adjacent item stacks thus being simultaneously introducible from said item stack throughput storage means into the respective insert space.

12. A commissioning device as set forth in claim 1, wherein said insert space includes a bottom, said item stacks resting on said bottom and being shiftable towards said shift-out space on said bottom, said bottom being located on a level corresponding to the limit of supply of items in said shift-out space monitored by said supply sensor.

13. A commissioning device as set forth in claim 1, wherein said insert space includes a bottom having a smooth sliding surface made of one of a metal and a synthetic material, said item stacks resting on said bottom and being shiftable towards said shift-out space on said bottom.

14. A commissioning device as set forth in claim 1, wherein said insert space includes a bottom provided with a plurality of rollers distributedly arranged over the bottom area, said item stacks resting on said bottom and being shiftable towards said shift-out space on said bottom.

15. A commissioning device as set forth in claim 1, wherein said insert space has a bottom formed by a conveying belt, said item stacks resting on said bottom and being shiftable towards said shift-out space on said bottom.

16. A commissioning device as set forth in claim 1, wherein said item stack throughput storage means has a conveying bottom serving as support for said item stacks.

17. A commissioning device as set forth in claim 16, wherein said conveying bottom is formed by a conveying belt.

18. A commissioning device as set forth in claim 16, wherein said conveying bottom is formed by a series of rollers.

19. A commissioning device as set forth in claim 1, wherein said supply sensor for said shift-out space is one of a photoelectric barrier and a light reflection sensor.

20. A commissioning device as set forth in claim 1, wherein said supply sensor for said shift-out space is an ultrasonic sensor.

21. A commissioning device as set forth in claim 1, wherein said supply sensor for said shift-out space is a mechanical sensing arm connected with a switch.

22. A commissioning device as set forth in claim 1, wherein said shifting device is a conveying belt.

23. A commissioning device as set forth in claim 22, wherein said conveying belt is equipped with one of knob-like catch noses and catch ledges at its side facing the item stack.

24. A commissioning device as set forth in claim 1, wherein said shifting device is at least one roller.

25. A commissioning device as set forth in claim 1, further comprising driving means provided for said shifting device, said driving means for said shifting device being one of an electric motor, a linear motor and a pneumatic advancing device.

26. A commissioning device as set forth in claim 1, further comprising a controllable locking flap provided between said shifting device and said conveying means and arranged to control the numbers of items shifted onto the conveying means.

* * * * *